United States Patent [19]
Murray et al.

[11] Patent Number: 5,174,352
[45] Date of Patent: Dec. 29, 1992

[54] RAFTER FOR RETRACTABLE AWNING

[75] Inventors: Brent W. Murray, Longmont; Thomas J. Greany, Boulder, both of Colo.

[73] Assignee: Carefree/Scott Fetzer Company, Broomfield, Colo.

[21] Appl. No.: 619,125

[22] Filed: Nov. 26, 1990

[51] Int. Cl.⁵ ............................................. E04F 10/06
[52] U.S. Cl. ...................................... 160/67; 160/69
[58] Field of Search ............ 160/67, 62, 71, 80, 160/22, 66, 68, 69, 70, 72, 73, 78, 79, 81, 54, 55, 65; 135/89

[56] References Cited

U.S. PATENT DOCUMENTS

| | | | |
|---|---|---|---|
| 1,915,529 | 6/1933 | Heiser | 160/70 |
| 2,511,294 | 6/1950 | Peterson | 160/65 |
| 3,612,145 | 10/1971 | Darula et al. | 160/67 |
| 3,720,438 | 3/1973 | Johnson et al. | 135/89 X |
| 3,834,400 | 9/1974 | Sattler | 135/89 |
| 4,077,419 | 3/1978 | Lux | 248/273 X |
| 4,160,458 | 7/1979 | Marcellus | 160/67 X |
| 4,640,332 | 2/1987 | Turner | 160/65 X |
| 4,719,954 | 1/1988 | Curtis et al. | 160/67 |
| 4,801,119 | 1/1989 | Pelletier | 135/89 X |
| 4,874,196 | 10/1989 | Goldstein et al. | 160/71 X |

Primary Examiner—David M. Purol
Attorney, Agent, or Firm—Gary M. Polumbus

[57] ABSTRACT

An improved rafter for use with a retractable awning for eliminating the sag in the canopy of the awning is automatically adjustable in length while retaining a somewhat constant axial pressure and is completely storable within the roll bar about which the canopy is wrapped.

11 Claims, 3 Drawing Sheets

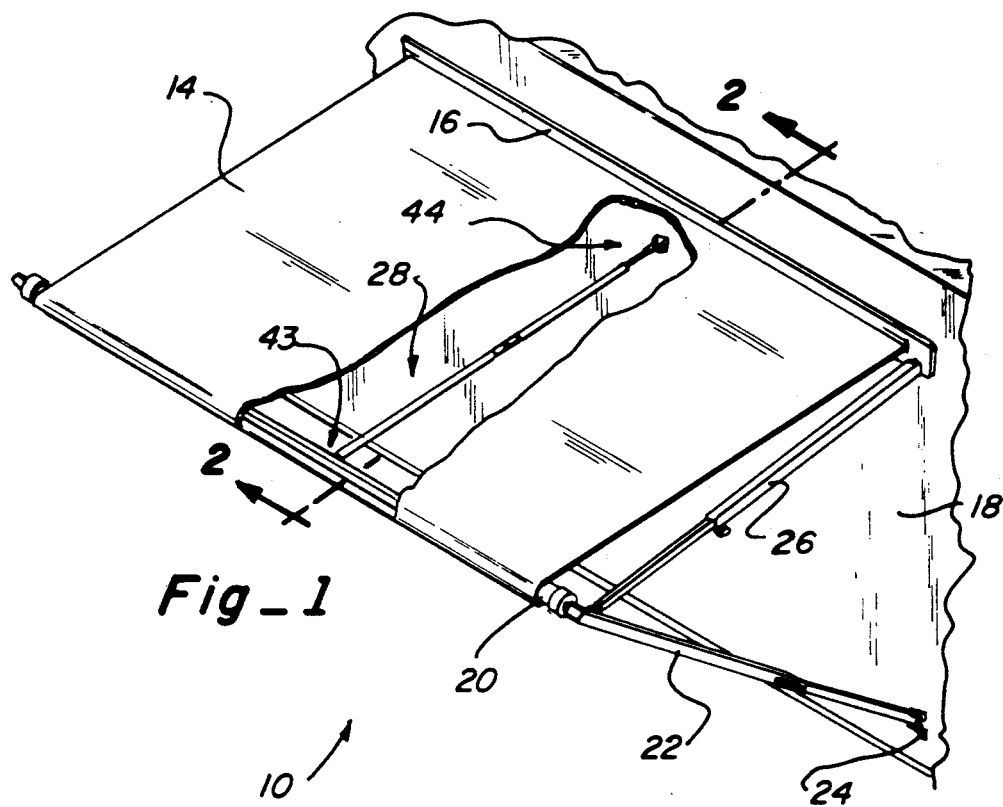
Fig_1
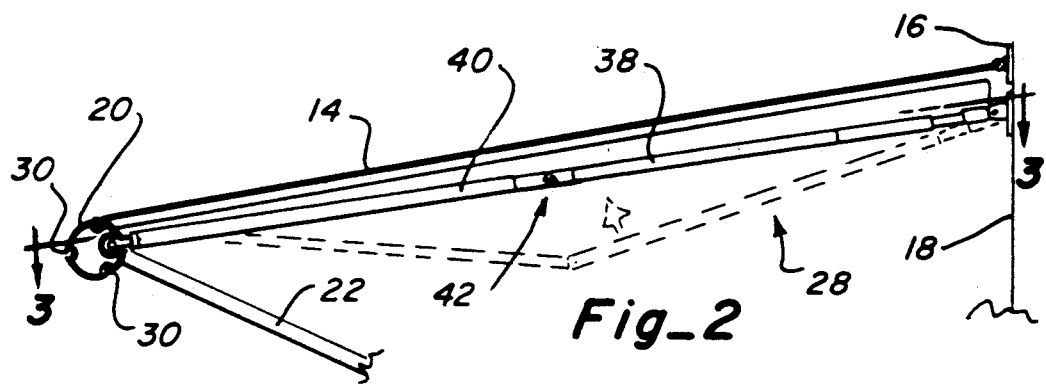
Fig_2
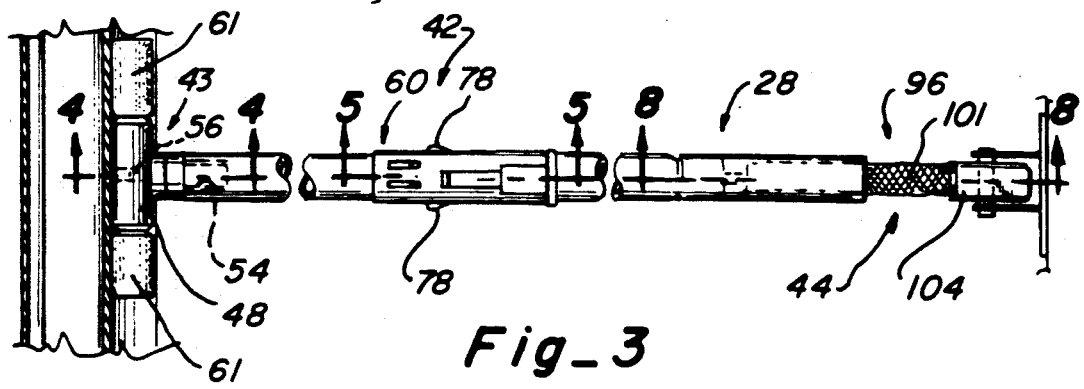
Fig_3

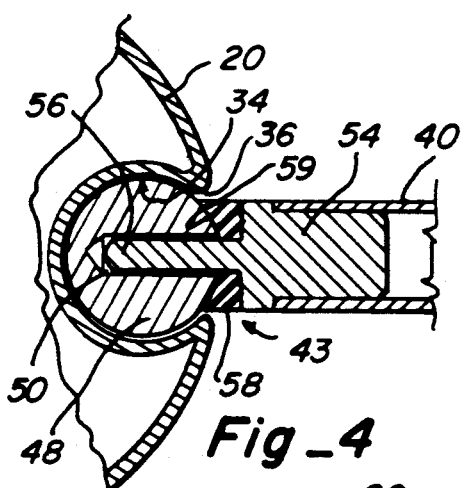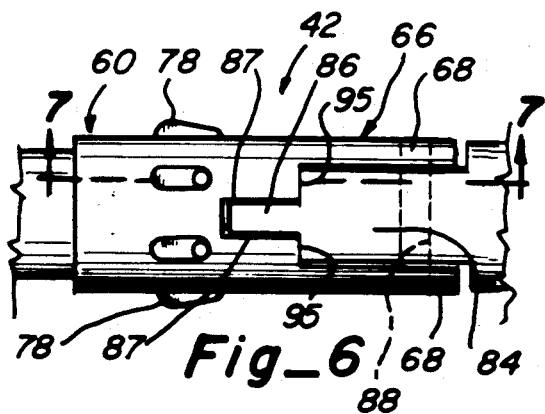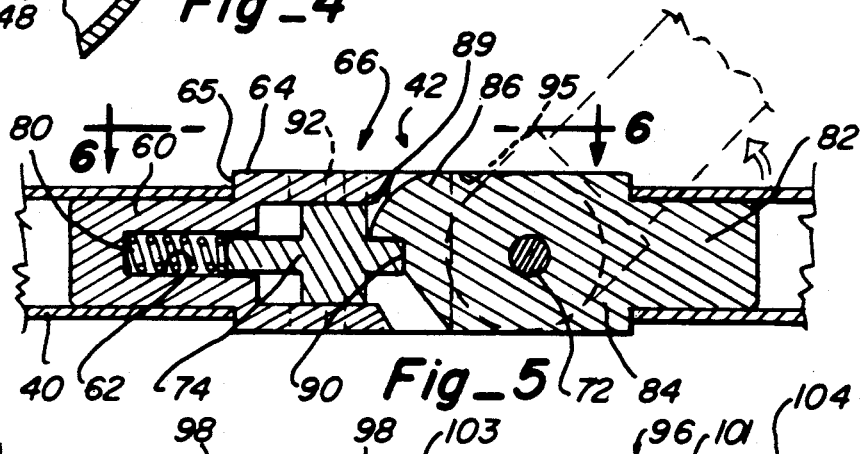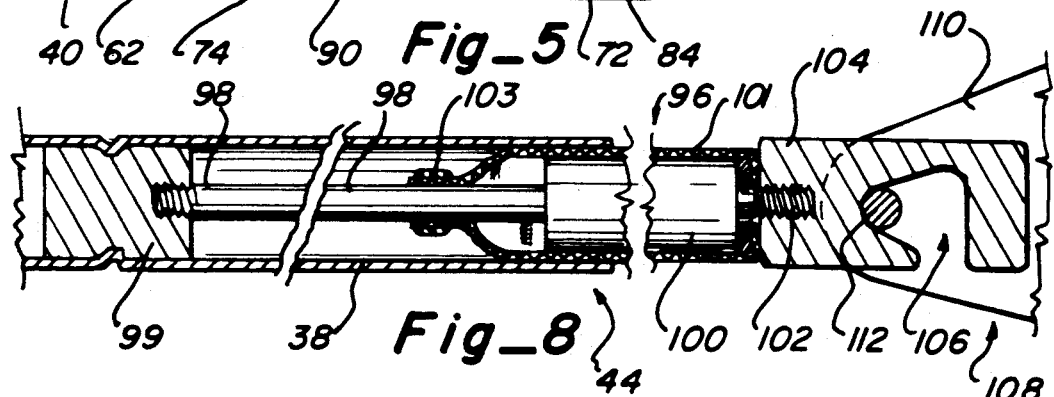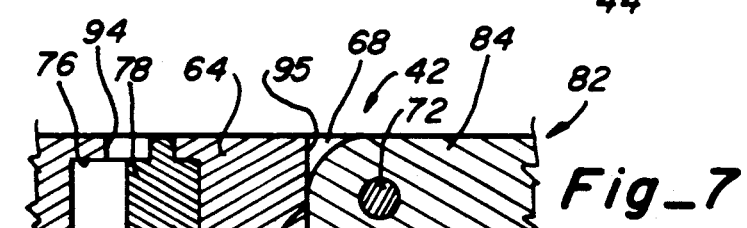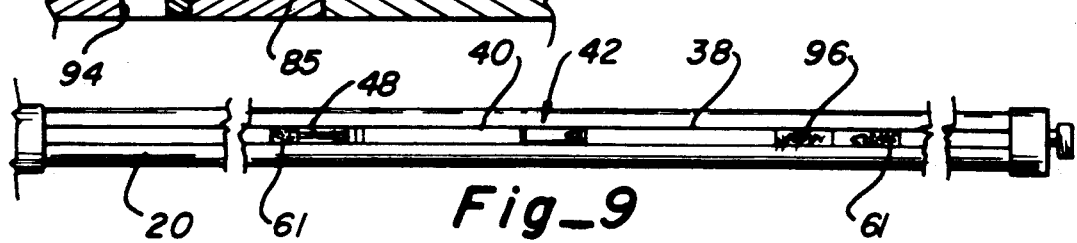

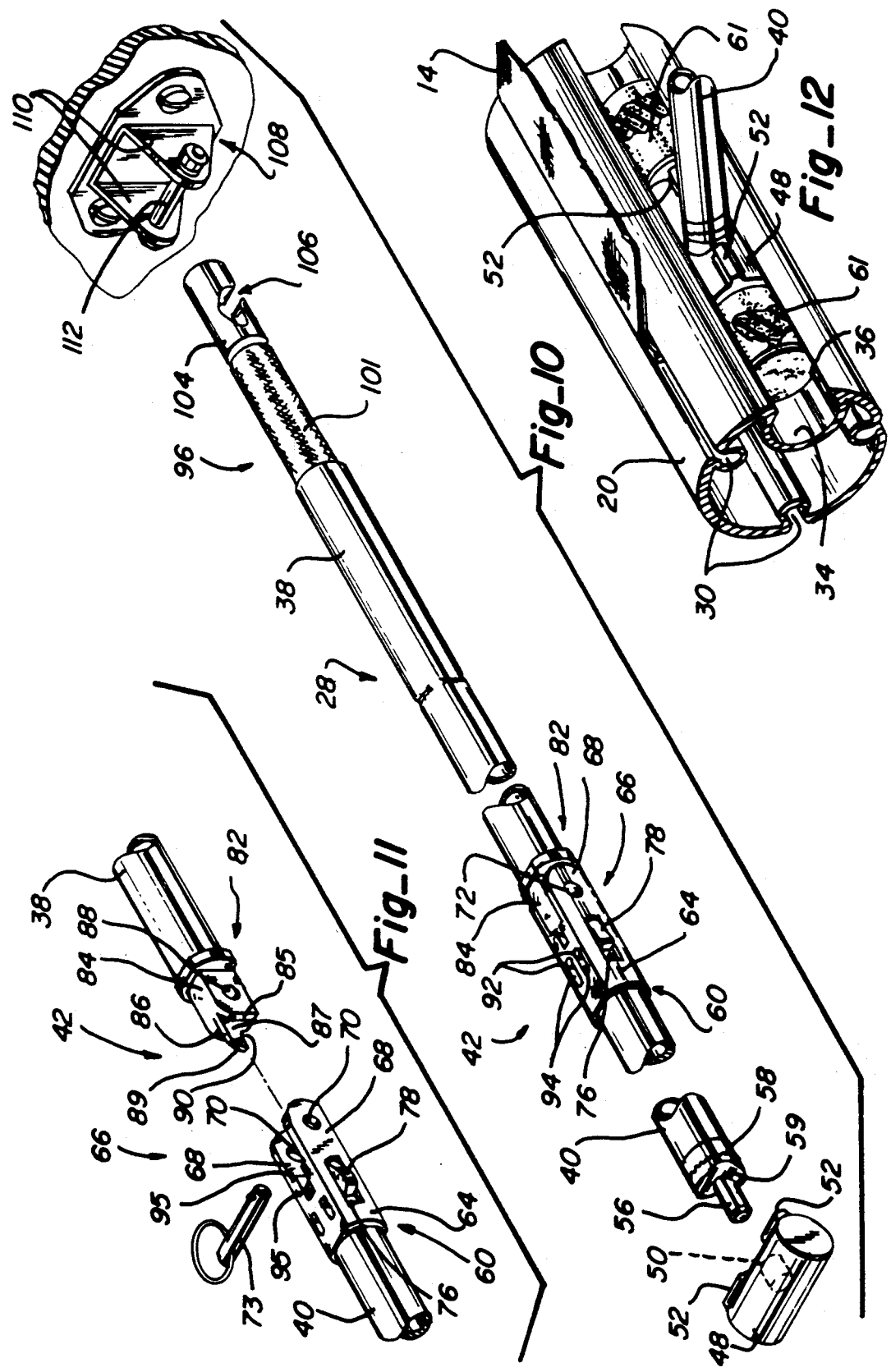

RAFTER FOR RETRACTABLE AWNING

BACKGROUND OF THE INVENTION

1. Field of the Invention

The present invention relates generally to retractable awnings and more particularly to an improved rafter adapted to prevent the canopy portion of the awning from sagging.

2. Description of the Prior Art

Retractable awnings may take numerous forms and have been designed for permanent mounting on fixed vertical surfaces such as over doors or windows of a building structure and have also been designed for mounting on movable objects such as recreational vehicles, mobile homes or the like. In the latter case, the awnings typically include a canopy that is secured along an inner edge to a supporting external wall of the vehicle and along an opposite parallel edge to a roll bar such that as the roll bar is moved away from the supporting surface, the canopy of the awning is extended. Similarly, movement of the roll bar toward the supporting surface causes the awning to roll about the roll bar into a storage position adjacent to the supporting surface. Support arms and rafters are typically utilized at opposite ends of the roll bar to bridge the space between the supporting surface and the roll bar thereby selectively bracing the awning in its extended condition.

One problem with retractable awnings of the aforenoted type, which particularly exists with relatively long awnings of 18 feet or more, resides in the fact that the roll bar will tend to bow inwardly toward the supporting surface allowing the canopy to sag. To remove the bow, reinforcing rafters have been employed in the prior art to bridge the space between the roll bar and the supporting surface at approximately a midpoint along the length of the roll bar but the rafters have been troublesome for various reasons. Rafters of this type have traditionally been individual items which need to be installed by an operator each time they are used or they have been pivotally attached at one end to the supporting surface so as to be extendable away from the surface to engage and brace the roll bar. Rafters of this type are usually mechanically and longitudinally extensible so that they can be made to press laterally against the roll bar and actually remove the bow from the roll bar. One drawback with prior art systems of this type is that in use of a rafter, for example, that is independent of the vehicle and the awning, it must be stored in the vehicle when not in use. In the case of rafters which are pivotally connected to the vehicle, they are normally stored on the side of the vehicle where they are aesthetically displeasing.

It is also worthy to mention that awnings of the type that are mounted on the side of a recreational vehicle or the like can usually be supported in at least two different conditions with one condition existing when the support arms have their lower ends attached to the side of the vehicle and another condition when the lower ends of the support arms rest upon the ground immediately beneath the ends of the roll bar. Normally, when moving the support arms between the two afore-described conditions, the elevation of the roll bar changes as does the distance between the roll bar and the side of the vehicle so that any rafter arm extending between the roll bar and the side of the vehicle must be adjusted in length. While most rafter arms have the capability of being longitudinally adjusted to accommodate such a circumstance, the longitudinal adjustment is normally made manually through use of a lever arm or the like and therefore requires additional time and patience.

It is to overcome the shortcomings in the prior art that the present invention has been developed.

SUMMARY OF THE INVENTION

The rafter of the present invention has been designed as an improvement to existing systems for reinforcing a retractable awning so as to remove the bow from a roll bar in order to prevent the canopy of the awning from sagging. The rafter is felt to be a decided improvement over prior art rafters in that a system has been discovered for mounting the rafter within the confines of the roll bar whereby it is readily deployable to reinforce the roll bar when in use but can be stored in an out of the way location that is not visible when the awning is retracted.

The rafter of the present invention is used in conjunction with a roll bar that has been uniquely formed to include an elongated recess in a sidewall thereof. The rafter is dimensioned to fit longitudinally within the recess so that it can be stored in the recess as the canopy is wrapped around the roll bar. The rafter is releasably connectable to a slidable anchor received in the recess and includes two elongated rigid sections which are interconnected by a pivot-lock member so that the rigid sections can be locked into a longitudinally aligned condition or allowed to pivot relative to each other. In this manner, the rafter can be easily removed from its stored location in the roll bar and extended toward the supporting surface on the vehicle before the two sections are locked in longitudinal alignment. This facilitates an easy handling of the rafter as the effective length of the rafter is relatively short when the sections are free to pivot relative to each other.

A bracket is provided on the supporting surface of the vehicle immediately adjacent to the connection of the canopy to the vehicle with the bracket being designed to releasably receive a free or distal end of the rafter. Normally, the distal end of the rafter would be positioned in the bracket before locking the two rigid sections of the rafter in longitudinally aligned relationship thereby facilitating placement of the rafter in use.

The distal end of the rafter has a length adjusting mechanism employed therein with the mechanism in the preferred embodiment being a gas spring. The gas spring is longitudinally extensible and retains a somewhat consistent and predictable compressive force on the rafter after it has been placed in position and the rafter rigidified through the pivot-lock member.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is an isometric view with parts removed of a retractable awning incorporating the auxiliary rafter of the present invention.

FIG. 2 is a section taken along line 2—2 of FIG. 1 with the auxiliary rafter shown in a fully extended solid line position and an angular phantom line position.

FIG. 3 is an enlarged section taken along line 3—3 of FIG. 2 with parts removed to save space.

FIG. 4 is an enlarged section taken along line 4—4 of FIG. 3.

FIG. 5 is an enlarged section taken along line 5—5 of FIG. 3.

FIG. 6 is a section taken along line 6—6 of FIG. 5.

FIG. 7 is a section taken along line 7—7 of FIG. 6.

FIG. 8 is an enlarged section taken along line 8—8 of FIG. 3.

FIG. 9 is a side view of the roll bar used in the awning of FIG. 1 showing the auxiliary rafter stored therein and with parts removed to save space.

FIG. 10 is an isometric view of the auxiliary rafter as well as the bracket and the slide member used to anchor its opposite ends with parts removed to save space.

FIG. 11 is an isometric fragmentary view showing an alternative embodiment of the pivot-lock member used in the auxiliary rafter.

FIG. 12 is an enlarged isometric view illustrating the connection of the rafter to the roll bar.

DESCRIPTION OF THE PREFERRED EMBODIMENT

With reference to FIG. 1, a retractable awning 10 incorporating the improved auxiliary rafter of the present invention is illustrated. The retractable awning can be seen to include a rectangularly shaped canopy 14 secured along an inner edge to a mounting rail 16 on the vertical side wall or supporting surface 18 of a recreational vehicle. The opposite edge of the canopy is secured in a roll bar 20 so that the canopy can be rolled around the roll bar when retracting the canopy into a stored or retracted position adjacent to the side 18 of the vehicle. A pair of longitudinally adjustable support arms 22 extend between the ends of the roll bar 20 and brackets 24 provided along a lower edge of the supporting surface 18. The support arms 22 are adapted to be disconnected from the brackets 24 and moved into a substantially vertical orientation (not illustrated) beneath the ends of the roll bar with the lower ends of the support arms resting on the ground. A pair of primary rafter arms 26, which are stowable within the support arms 22, assist in retaining the awning in an extended position. The rafter arms 26 removably extend between the roll bar and the mounting rail when the awning is extended. The auxiliary rafter 28 of the present invention is adapted to extend between the roll bar and the side 18 of the vehicle at a location approximately midway along the length of the roll bar to prevent the roll bar from bowing and thereby creating a sag in the canopy 14.

The auxiliary rafter 28 of the present invention is used in cooperation with a roll bar 20 of the type described in copending application Ser. No. 07/619,121 filed Nov. 26, 1990 and entitled Improved Roll Bar which is of common ownership with the present invention. The roll bar, as seen best in FIG. 12, is of generally cylindrical construction having several circumferentially spaced small elongated grooves or recesses 30 provided in its cylindrical wall. The small grooves 30 are used in a conventional manner to anchor the associated edge of the canopy 14. In addition, the roll bar includes a relatively large substantially cylindrical elongated recess 34 of approximately one inch in diameter that opens through an elongated slot 36 in the cylindrical wall of the roll bar. The slot 36 is of smaller width than the diameter of the recess 34. The roll bar is connected to the canopy 14 so that the large recess 34, which extends the entire length of the roll bar, opens generally toward the supporting surface 18 on the vehicle immediately adjacent to the underside of the canopy.

The auxiliary rafter 28 includes inner and outer elongated tubular sections 38 and 40 respectively preferably made of a hard, non-corrosive material such as stainless steel that are pivotally connected at adjacent ends by a pivot-lock member 42. The opposite end 43 of the outer section 40 is releasably attachable to the roll bar 20 and the opposite end 44 of the inner section 38 has a length adjustment system for releasable attachment to the supporting surface 18 of the vehicle.

The releasable connection of the outer section 40 of the rafter 28 to the roll bar 20 is best seen in FIGS. 3, 4, 10 and 12 and is accomplished through use of a cylindrical anchor 48 having a diameter that is slightly smaller than the inner diameter of the recess 34. The cylindrical anchor has a blind diametrical bore 50 formed therein and a pair of aligned longitudinally extending ribs 52 on either side of the bore which protrude into the slot 36 to prevent the anchor from rotating in the recess 34. The outermost end 43 of the outer section 40 frictionally receives an elongated plug 54 that has a pin 56 protruding axially therefrom with the pin being adapted to be received within the bore 50 in the anchor. A washer 58 is received and fixedly positioned on the pin 56 with the washer having an arcuate concave face 59 adapted to mate with the outer surface of the cylindrical plug so as to fix the position of the auxiliary rafter 28 relative to the anchor 48 as best seen in FIG. 12. In other words, the receipt of the pin 56 in the bore 50 will force the rafter to extend radially away from the anchor and the washer 58 will fix the circumferential angle of the rafter relative to the anchor for reasons which will become more clear later. The anchor may be made of metal or a hard rubber material which can be readily slid longitudinally of the recess 34 but upon the application of compressive force against the anchor, it will remain in position through frictional engagement of the anchor with the inner wall of the recess. To further assist in positively positioning the anchor, a pair of compressible foam plugs 61 can be positioned in the recess 34 on opposite sides of the anchor.

The pivot-lock member or elbow 42 is probably best illustrated in FIGS. 5 through 7, 10 and 11 and includes two components. The first component 60 is in the form of a plug adapted to be inserted and retained in the intermost end of the outer rafter section 40 by friction and crimping. A cylindrical axial bore 62 is provided in the end of the plug which opens into a hollow interior of an integral cylindrical cap 64. One end 65 of the cylindrical cap 64 abuts against the end of the outer rafter section when the plug is fully inserted into the open end of the rafter section. The cylindrical cap has a clevis 66 formed in its open end which defines a pair of spaced arms 68 having axially aligned cylindrical openings 70 to receive a pivot pin. The pivot pin could be in the form of a rivet 72 as shown in FIG. 10, a pull pin 73 as shown in FIG. 11, or even could be a threaded bolt (not shown) which may be desirable to separate the rafter into its two sections for shipping purposes. A slide lock finger 74 is positioned within the hollow interior of the cylindrical cap 64 and protrudes laterally outwardly through slots 76 provided in the cylindrical wall of the cap so as to define finger gripping surfaces 78 for manual sliding movement of the lock finger in a manner to be described later. A compression spring 80 is seated in the bore 62 at the end of the plug so as to bias the lock finger 74 axially toward the inner section 38 of the rafter.

The second component 82 of the pivot-lock member 42 is also in the form of a plug with this plug being adapted to be inserted into and retained in the outermost end of the rafter section 38 by friction and crimping. As probably best seen in FIG. 11, the second component has a first relatively thick block-shaped head 84 with a flat leading end 85 facing toward the outer rafter section 40 and a pair of flat side faces. A second relatively thin head 86 has flat side faces 87 and a partially rounded leading end 89 forming an axial projection away from the thick block-shaped head 84. The thick head 84 has a cylindrical passage 88 extending perpendicularly therethrough adapted to be aligned with the openings 70 through the arms 68 of the clevis 66 so that the pivot pin 72 or 73 can be extended therethrough and will pivotally connect the second component of the elbow to the clevis on the first component. Accordingly, the heads 84 and 86 of the second component 82 are pivotally swingable within the slot defined by the clevis 66 and the axial end of the relatively thin head 86 has a notch 90 formed therein adapted to receive the lock finger 74 when the rafter sections are longitudinally aligned. The bias applied to the lock finger by the compression spring 80 forces the lock finger into the notch 90 in the end of the second component to releasably but securely retain a longitudinally aligned relationship between the inner and outer rafter sections.

The finger gripping surfaces 78 on the lock finger 74 can be gripped to axially slide the lock finger out of the notch 90 in order to release the rafter sections to allow them to pivot freely. The partially rounded leading end 89 of the thin head 86 serves as a cam surface in engaging the lock finger so that as the rafter sections are moved into longitudinal alignment, the lock finger is compressed against the compression spring until it becomes aligned with the notch in the second component at which time the lock finger is forced into the notch by the compression spring. It should be noted that sliding movement of the lock finger is limited by a pair of pins 92 provided on the top surface of the lock finger which are received and guided in a pair of slots 94 formed in the cylindrical cap 64.

The rafter sections are prevented from being pivoted in one direction beyond an axially aligned relationship by the abutment of the flat leading end 85 of the block-shaped head 84 with a pair of shoulders 95 (FIGS. 7 and 11) formed on the interior of the clevis 66. This is probably best illustrated in FIG. 7.

The innermost end 44 of the inner rafter section 38 receives a gas spring 96 with a piston rod 98 of the gas spring being anchored within the hollow interior of the inner section 38 through use of a collar 99 crimped within the section 38 and threaded onto the end of the piston rod. A cylinder body portion 100 of the gas spring extends axially away from the end of section 40. The gas spring 96 is a conventional item readily available from numerous sources but a gas spring manufactured by Gas Spring Company of Colmar, Pa. under Series No. FJN34 has been found to be highly suitable. A detailed description of a gas spring is not felt necessary but suffice it to say that the piston rod 98 of the gas spring is adapted to be longitudinally extended from the cylinder 100 while maintaining a relatively constant axial compressive force. The above-noted gas spring retains 80 pounds of force at its fully extended stroke and approximately 110 pounds at a fully compressed stroke. It will thus be appreciated that regardless of how far the piston 100 in the gas spring has been extended, a biasing compressive force can be maintained axially along the length of the rafter 28. In this manner, an outwardly directed force or bias can be constantly maintained on the roll bar 20 to prevent a bow in the roll bar and thus a sag in the canopy 14.

In order to prevent the cylinder 100 from corroding, a flexible braided sleeving 101 of polyester is placed around the cylinder with one end of the sleeving 101 being frictionally retained against the outer end of the cylinder 100 by a catch member 104 to be described hereinafter. The opposite end of the sleeving 101 is held in a collar 103 that is loosely fitted around the piston rod 98 so that the rod can easily slide therewithin. The sleeving is a conventional item that can be purchased from McMaster-Carr Supply Company of Chicago, Ill., under part no. 5547K28.

The innermost end of the cylinder 100 has a threaded shaft 102 onto which is threadedly received the catch member 104. The catch member 104 includes a cylindrical body having a downwardly opening generally trapezoidal notch 106 formed in a lower surface thereof. The notch 106 will always be disposed on the lower surface of the catch and open downwardly due to the fact that the washer 58 on the opposite end of the rafter mates with the cylindrical anchor 48 to assure that the notch 106 either opens upwardly or downwardly but since the pivotlock member will only allow the sections of the rafter to pivot downwardly, the notch 106 will always open downwardly.

A bracket 108 is affixed to the supporting surface 18 on the recreational vehicle immediately beneath the mounting rail 16 and preferably at a centered location relative to the length of the awning. The bracket has a pair of flanges 110 which support a horizontal rod 112 that can be inserted into the 15 trapezoidal notch 106. The configuration of the notch 106 serves to releasably retain the rod 112 in the notch when axial pressure is applied by the gas spring 96.

In order to place the auxiliary rafter 28 in its use position, the awning is first rolled out to its fully extended condition wherein the recess 34 in the roll bar 20 is open and directed toward the side 18 of the vehicle. The rafter 28, which is of a length to lie completely within the recess 34 when stored, can then be easily removed from the recess 34 through the slot 36. With the pivot-lock member 42 released so that the inner and outer sections 38 and 40 respectively are free to pivot relative to each other, the pin 56 is inserted into the bore 50 in the cylindrical anchor 48 and subsequently the catch member 104 on the free end of the cylinder 100 is positioned on the rod 112 of the bracket 108. The sections 38 and 40 of the rafter are then forced into a longitudinally aligned relationship. Upon doing so, the pivot-lock member automatically latches the two sections of the rafter in longitudinally aligned relationship. As the two sections are being moved into longitudinally aligned relationship, the gas spring 96 automatically adjusts the length of the rafter to fit between the side 18 of the vehicle and the roll bar 20 and retains a substantially constant axial compressive force on the rafter between 80-110 pounds. This force has been found suitable and adequate for removing the bow from the roll bar so that the canopy 14 can be retained in a taut condition.

A particular advantage of the rafter of the present invention resides in the fact that if it were desired to move the support arms 22 of the awning from the bracing position illustrated in FIG. 1, wherein the arms are supported by the brackets 24 on the side of the vehicle, to an unattached position wherein the support arms are vertically aligned beneath the roll bar 20 and supported on the ground (not shown), the gas spring 96 will automatically accommodate the resultant movement of the roll bar. The gas spring accommodates the movement by automatically allowing the piston rod 98 to extend but, as mentioned previously, the axial compressive force retained on the rafter by the gas spring will overcome the bow in the roll bar regardless of the extent to which the gas spring has been extended.

It will be appreciated from the foregoing disclosure that an improved rafter has been described which is easy to operate while satisfactorily removing the bow from a roll bar and consequently any sag from the canopy of the awning. The length of the rafter is also self adjusting to accommodate various orientations of the awning while retaining enough compressive force along the length of the rafter to prevent the roll bar from bowing. The rafter 28 can be stored in the recess 34 (FIG. 9) or in the event the rafter is not used in conjunction with an awning having a roll bar with a recess 34 or the equivalent thereof, the rafter can be stored elsewhere. If the roll bar disclosed herein were not available, it would also be necessary to modify a conventional roll bar by providing a hole into which the pin 56 on the end of the rafter could be inserted to releasably secure one end of the rafter to the roll bar.

Although the present invention has been described with a certain degree of particularity, it is understood that the present disclosure has been made by way of example, and changes in detail or structure may be made without departing from the spirit of the invention, as defined in the appended claims.

We claim:

1. In a retractable awning of the type that is movable between an extended and a retracted condition, said awning having a flexible canopy, a roll bar secured to an edge of the canopy about which the canopy can be rolled when the awning is in its retracted condition, said roll bar including an elongated recess in an outer surface thereof, and support means connected to a supporting surface for retaining the awning on the supporting surface in both its extended and retracted conditions, said support means including a pair of support arms adapted to extend away from said supporting surface and releasably retain the awning in its extended condition, wherein the improvement comprises an elongated rafter removably disposed along its length in said recess, said rafter having a first end operably connected to said roll bar and an opposite second end, a retention member on said supporting surface, said retention member being adapted to releasably retain said second end of the rafter when the awning is extended.

2. In the retractable awning of claim 1 further including anchor means in said roll bar adapted to releasably receive said first end of the rafter.

3. In the retractable awning of claim 2 wherein said anchor means is slidably disposed in said recess.

4. In the retractable awning of claim 2 wherein said rafter further includes length adjustment means for varying the length of the rafter.

5. In the retractable awning of claim 4 wherein said length adjustment means includes biasing means for establishing compression in the rafter when the rafter is deployed between said roll bar and the retention member.

6. In the retractable awning of claim 5 wherein said length adjustment mean automatically retains a somewhat constant compression in the rafter regardless of the length of the rafter when deployed between said roll bar and the retention member.

7. In the retractable awning of claim 4 wherein said rafter includes at least two elongated rigid sections and a pivot-lock member interconnecting said sections whereby the sections can be selectively locked in longitudinally aligned relationship or freely pivoted relative to each other.

8. In a retractable awning of the type that is moveable between an extended and a retracted condition, said awning having a flexible canopy, a roll bar secured to an edge of the canopy about which the canopy can be rolled when the awning is in its retracted condition, aid roll bar including an elongated recess in an outer surface thereof, and support means connected to a supporting surface for retaining the awning on the supporting surface in both its extended and retracted conditions, said support means including a pair of support arms adapted to extend away from said supporting surface and releasably retaining the awning in its extended condition, wherein the improvement comprises an elongated rafter removably disposed along its length in said recess, said rafter having a first end operably connectable to said roll bar and an opposite second end, a retention member on said supporting surface, said retention member being adapted to releasably retain said second end of the rafter when the awning is extended.

9. In a retractable awning of a type that is movable between an extended and a retracted condition, said awning having a flexible canopy, a roll bar secured to an edge of the canopy about which the canopy can be rolled when the awning is in its retracted condition, said roll bar including anchor means and an elongated recess in an outer surface thereof, and a support means connected to a supporting surface for retaining the awning on the supporting surface in both its extended and retracted conditions, said support means including a pair of support arms adapted to extend away from said supporting surface and releasbly retain the awning in its extended condition, wherein the improvement comprises a rafter removably disposed in said recess, said rafter having a first end releasably receivable in said anchor means of the roll bar and an opposite second end, a retention member on such supporting surface, said retention member being adapted to releasably retain said second end of the rafter when the awning is extended, said rafter further including length adjustment means for varying the length of the rafter, said length adjustment means including biasing means in the form of a gas spring for establishing compression in the rafter when the rafter is deployed between said roll bar and the retention member.

10. In a retractable awning of a type that is movable between an extended and a retracted condition, said awning having a flexible canopy, a roll bar secured to an edge of the canopy about which the canopy can be rolled when the awning is in its retracted condition, said roll bar including anchor means and an elongated recess in an outer surface thereof, and support means connected to a supporting surface for retaining the awning on the supporting surface in both its extended and retracted conditions, said support means including a pair of support arms adapted to extend away from said supporting surface and releasably retain the awning in its extended condition, wherein the improvement comprises a rafter removably disposed in said recess, said rafter having a first end releasably received in said anchor means of said roll bar and an opposite second end, a retention member on said supporting surface, said retention member being adapted to releasably retain said second end of the rafter when the awning is extended, said rafter further including length adjustment means in the form of a gas spring for varying the length of the rafter, and wherein said rafter includes at least two elongated rigid sections and a pivot-lock member interconnecting said sections whereby said sections can be respectively locked in longitudinally aligned relationship or freely pivoted relative to each other.

11. In a retractable awning of a type that is movable between an extended and a retracted condition, said awning having a flexible canopy, a roll bar secured to an edge of the canopy about which the canopy can be rolled when the awning is in its retracted condition, said roll bar including anchor means and an elongated recess in an outer surface thereof, and support means connected to a supporting surface for retaining the awning on the supporting surface in both its extended and retracted conditions, said support means including a pair of support arms adapted to extend away from said supporting surface and releasably retain the awning in its extended condition, wherein the improvement comprises a rafter removably disposed in said recess, said rafter having a first end releasably received in said anchor means of said roll bar and an opposite second end, a retention member on said supporting surface, said retention member being adapted to releasably retain said second end of the rafter when the awning is extended, said rafter further including length adjustment means for varying the length of the rafter, and wherein said rafter includes at least two elongated rigid sections and a pivot-lock member interconnecting said sections whereby said sections can be respectively locked in longitudinally aligned relationship or freely pivoted relative to each other, and wherein said pivot-lock member includes a first component secured to the end of said rigid sections and a second component secured to the other of said rigid sections, said second component part having a flat plate element with a notch formed therein and said first component having a clevis in which the flat plate element is pivotally retained, said first component further including a spring biased lock finger adapted to selectively cooperate with said notch in retaining the two rigid sections in longitudinally aligned relationship.

* * * * *

UNITED STATES PATENT AND TRADEMARK OFFICE
CERTIFICATE OF CORRECTION

PATENT NO. : 5,174,352
DATED : December 29, 1992
INVENTOR(S) : Brent W. Murray, et al It is certified that error appears in the above-indentified patent and that said Letters Patent is hereby corrected as shown below:

Column 5, line 6: "--the rafter--" should read -- the inner rafter --

Column 5, line 57: "--section 40--" should read -- section 38 --

Column 6, line 37: "--the 15 trapezoidal--" should read -- the trapezoidal --

Column 8, line 18: "--condition, aid--" should read -- condition, said --

Column 8, line 25: "--retaining--" should read -- retain --

Signed and Sealed this

Nineteenth Day of October, 1993

Attest:

BRUCE LEHMAN

Attesting Officer     Commissioner of Patents and Trademarks